US006582803B2

(12) United States Patent
Cole et al.

(10) Patent No.: US 6,582,803 B2
(45) Date of Patent: Jun. 24, 2003

(54) INK-JET PRINTABLE TRANSFER MEDIA COMPRISING A PAPER BACKING CONTAINING REMOVABLE PANELS

(75) Inventors: Robert Cole, North Kingstown, RI (US); Phillip Wheeler, Warwick, RI (US); Zhong Xu, Worcester, MA (US); Shengmei Yuan, Coventry, RI (US)

(73) Assignee: Arkwright Incorporated, Fiskeville, RI (US)

( * ) Notice: Subject to any disclaimer, the term of this patent is extended or adjusted under 35 U.S.C. 154(b) by 0 days.

(21) Appl. No.: 09/901,844

(22) Filed: Jul. 9, 2001

(65) Prior Publication Data

US 2003/0008112 A1 Jan. 9, 2003

(51) Int. Cl.[7] ............................ B32B 27/14; B32B 3/00

(52) U.S. Cl. ....................... 428/195; 428/914; 156/235; 156/240; 156/277; 156/289

(58) Field of Search ................................ 428/195, 213, 428/219, 327, 340, 913, 914; 156/235, 240, 277, 289

(56) References Cited

U.S. PATENT DOCUMENTS

| | | | | | |
|---|---|---|---|---|---|
| 3,859,157 | A | | 1/1975 | Morgan | 156/268 |
| 3,900,645 | A | | 8/1975 | Morgan | 428/41 |
| 4,220,490 | A | | 9/1980 | Carlson | 156/257 |
| 4,258,092 | A | | 3/1981 | Labar | 428/40 |
| 4,537,809 | A | * | 8/1985 | Ang et al. | 428/41 |
| 5,460,681 | A | | 10/1995 | Horner | 156/344 |
| 5,501,902 | A | * | 3/1996 | Kronzer | 428/323 |
| 5,571,587 | A | | 11/1996 | Bishop et al. | 428/43 |
| 5,948,586 | A | | 9/1999 | Hare | 430/138 |
| 6,083,656 | A | | 7/2000 | Hare et al. | 430/138 |
| 6,087,061 | A | | 7/2000 | Hare et al. | 430/256 |
| 6,497,781 | B1 | | 12/2002 | Dalvey et al. | 156/234 |

FOREIGN PATENT DOCUMENTS

| | | |
|---|---|---|
| WO | WO 98/30749 | 7/1998 |
| WO | WO 00/73570 A1 | 12/2000 |

OTHER PUBLICATIONS

PCT Notification of Transmittal of the International Search Report or the Delcaration.

* cited by examiner

*Primary Examiner*—Bruce H. Hess
*Assistant Examiner*—B. Shewareged
(74) *Attorney, Agent, or Firm*—Barlow, Josephs & Holmes, Ltd.

(57) ABSTRACT

The present invention relates to ink-jet transfer media that can be printed with images using ink-jet printers. The printed image can be thermally transferred to fabric materials such as black or white colored T-shirts. The ink-jet transfer media of this invention comprise a support paper containing independently removable panels. Each removable panel is capable of being peeled away from the film coating. The removable panels are divided by means of a peel line in the paper.

10 Claims, No Drawings

INK-JET PRINTABLE TRANSFER MEDIA COMPRISING A PAPER BACKING CONTAINING REMOVABLE PANELS

BACKGROUND OF THE INVENTION

1. Field of the Invention

The present invention relates to ink-jet transfer media that can be printed with images using ink-jet printers. The printed image can be thermally transferred to fabric materials such as such as black or white colored T-shirts. The ink-jet transfer media of this invention comprise a support paper containing independently removable panels divided by means of a peel line.

2. Brief Description of the Related Art

There is growing interest in producing customized images (i.e., photos, messages, illustrations, and the like) on T-shirts, sweatshirts, and other fabric materials using home computers. Generally, such processes involve generating a computerized image and sending it to an ink-jet printer that prints the image on an ink-jet printable thermal-transfer medium. Typically, a commercially available ink-jet transfer medium comprises a support paper coated with a series of layers including an "ink-receptive" layer that overlays a "hot-melt" layer.

A variety of methods are used to thermally transfer the image to the fabric. In one method, a person places the imaged medium over the fabric so that the image faces down and is in direct contact with the fabric. Then, the person irons the back surface of the support paper with a hand iron to transfer the image to the fabric. The person peels-off the paper after completely transferring the image to the fabric. The support paper can be removed while the paper is still hot or subsequent to cooling.

An alternative method comprises the steps of: 1) printing an image on the coated surface of the support paper, 2) removing the entire support paper from the imaged coating, 3) placing the imaged coating on a fabric material, 4) placing a silicone-coated paper over the imaged coating, and 5) ironing the silicone-coated paper, whereby the image is transferred to the fabric.

Hare et al., U.S. Pat. Nos. 6,087,061, 6,083,656, and 5,948,586, disclose a method for applying an image to a fabric employing a "cold peel" transfer sheet. The patents disclose that the method involves providing a base paper for the coatings, wherein the inside of the base paper is of an easy release such as silicone. After the coatings with the support sheet have passed through the copier, the silicone support is peeled from the coatings. The coatings are placed on top of the fabric, and a silicone paper is placed directly over the coatings. The silicone paper is hand-ironed to press the coating into the fabric.

In practice, consumers may experience difficulty using commercially available ink-jet transfer media. Particularly, consumers may find it difficult to separate the support paper from the film coating that is applied to the surface of the paper. Further, as described above, the film coating comprises a series of layers including hot melt and ink-receptive layers, and these coating layers tend to be fragile. The coating layers may rip when the support paper is separated from the coating layers. Rips and tears in the coating layers may result in visible image defects on the fabric. In view of such problems, it would be desirable to have an ink-jet printable transfer medium containing a support paper that consumers could easily remove. Further, it would be desirable to have a transfer medium containing a support paper having removable sections that could be removed piece-by-piece. A consumer would be able to better position and align images on the fabric using such a support paper as described further below. The present invention provides such improved ink-jet printable transfer media.

SUMMARY OF THE INVENTION

The present invention relates to an ink-jet printable transfer medium comprising a support paper having a surface coated with an ink-receptive film coating, said support paper comprising at least two independently removable panels divided by means of a peel line, wherein each panel is capable of being peeled away from the film coating.

In one embodiment, the peel line is a scored line extending from one edge to the opposite edge of the paper. The paper can contain multiple peel lines and more than two removable panels.

Preferably, the ink-receptive film coating comprises a resin selected from the group consisting of polyurethanes, polyamides, polyacrylates, polyolefins, polyesters, poly(vinyl alcohol), poly(vinyl pyrrolidone), polyvinyl chloride, cellulose, and ethylene-vinyl acetate copolymers, and mixtures and copolymers thereof. The ink-receptive film coating can further comprise particles selected from the group consisting of polyamides, polyolefins, polyesters, and ethylene-vinyl acetate copolymers.

The support paper can be coated first with a silicone coating and/or a hot-melt film coating. Preferably, the hot-melt coating comprises a thermoplastic polymer selected from the group consisting of waxes, polyamides, polyolefins, polyesters, poly(vinyl chloride), poly(vinyl acetate), poly(vinyl alcohol), polyacrylates, polyacrylic acid, polymethacrylic acid, poly(ethylene-co-acrylic acid), poly(ethylene-co-methacrylic acid), poly(ethylene-co-vinyl acetate) polymers and the ionomers, salts, copolymers, and mixtures of these materials.

In one embodiment, the support paper can be coated with film coating (a) comprising a polyurethane binder and inorganic pigment, and ink-receptive film coating (b) comprising a polyurethane binder and organic polymeric particles. Suitable inorganic pigments include those selected from the group consisting of silica, alumina, titanium dioxide, zinc sulfide, zinc oxide, antimony oxide, barium sulfate, and calcium carbonate. Suitable organic polymeric particles include those selected from the group consisting of polyamides, polyolefins, and polyesters.

In another embodiment, the support paper can be coated with a) a hot-melt film coating comprising an ethylene/acrylic acid copolymer, and b) an ink-receptive film coating overlaying the hot-melt coating. The ink-receptive film coating comprises a polyamide resin and polyamide particles.

Typically, the total weight of the coating is in the range of about 30 to about 70 grams per square meter, and the thickness of the support paper is in the range of about 2 mils to about 10 mils.

Also, the present invention encompasses a method for applying an image to a fabric material, for example, black or white colored T-shirts, using the above-described ink-jet printable transfer medium. The method comprises the following steps:

a) printing an image on the ink-receptive film coating with an ink-jet printer, b) peeling away at least one removable panel of the support paper from the imaged film coating, c) placing the imaged film coating on a fabric material, d) placing a protective paper (e.g., a silicone-coated transparent paper) over the imaged film coating, e) hand-ironing the protective paper so that the imaged film coating is pressed into the fabric and the image is transferred to the fabric; and f) removing the protective paper from the fabric.

Referring to above step (b), each removable panel of the support paper can be removed prior to placing the imaged film coating on the fabric. The imaged film coating can be positioned on the fabric in step (c) such that the image faces upwards or downwards.

The protective paper can comprise time/temperature indicators. In one embodiment, the paper can be printed with a symbol using thermal chromatic ink that changes color when heated to a specific temperature over time. In other embodiments, the time/temperature indicator can be incorporated into a coating that is applied to the protective paper, or a time/temperature indicator adhesive strip can be applied to the protective paper. Further, the protective paper can comprise thermal-activating color additives, fragrance additives, and insect-repellent additives, and the like that release from the paper when the paper is heated to a specific temperature. The removable panels of the support paper can also comprise such time/temperature indicators and thermal-activating additives.

DETAILED DESCRIPTION OF THE PREFERRED EMBODIMENT

The ink-jet printable transfer papers of this invention can be made using any suitable support substrate. For example, spun-bonded polyethylene fabric (TYVEK), polyester film, book cloth, canvas, and metal foil can be used. Paper substrates are particularly preferred. Examples of suitable support papers include plain papers, clay-coated papers, and resin-coated papers such as polyethylene-coated papers and latex-impregnated papers. The thickness of the support paper may vary, but it is typically in the range of about 2 mils (51 $\mu$m) to about 10 mils (254 $\mu$m). The support paper has a front surface and a back surface. A design, product trademark, company logo, or the like can be printed on the back surface of the paper.

The front surface, i.e., imaging surface, of the paper is coated with an ink-receptive film coating. The ink-receptive coating is capable of absorbing aqueous-based ink-jet printer inks to form an image. The majority of inks used in ink-jet printing devices are aqueous-based inks containing molecular dyes or pigmented colorants. Water is the major component in aqueous-based inks. Small amounts of water-miscible solvents such as glycols and glycol ethers may also be present in the ink. The ink-receptive coating comprises a film-forming resin such as, for example, polyvinyl alcohols; poly(vinyl pyrrolidone); poly(2-ethyl-2-oxazoline); poly (ethylene oxide); poly(ethylene glycol); acrylic acids; starch; cellulose; cellulose derivatives; gelatins; polyvinyl chloride; polyvinylidene chloride; acrylates; methacrylates; polyvinyl acetate; polyacrylonitrile; polystyrenes; polyesters; polyamides; polyurethanes; and copolymers and mixtures thereof.

The support paper comprises at least two independently removable sections or panels that are each capable of being peeled away from the ink-receptive film coating. In the present invention, the panels of the support paper are separated from the film coating at a point during the image-transfer process as described in further detail below. The removable panels of the paper are divided by means of a peel line in the paper. The peel line can run in any direction, and it typically extends from one edge to an opposite edge of the paper. For example, the peel line can run in a longitudinal direction from the top edge to bottom edge of the paper, or in a latitudinal direction from a side edge to the opposite side edge. Alternatively, the peel line can run in a diagonal direction from one edge to any other edge of the paper. Preferably, the peel line(s) run in a direction that is generally parallel to the direction that the medium follows through the ink-jet printer. The paper can contain a single peel line or a plurality of peel lines. The paper can contain multiple removable panels. Any suitable method can be used to mark the peel line. For example, the peel line can be notched, grooved, or perforated. In one embodiment, the peel line can comprise a series of perforated segments.

Conventional scoring techniques can be used to form the peel line. For example, a scoring knife or blade can be used to score the paper. Typically, the ink-receptive coating is applied to the front surface of the paper and dried. Then, a scoring knife or blade is used to score the back surface of the paper. When such a scoring method is used, care should be taken to prevent scoring of the film coating on the surface of the paper. The peel line can be relatively noticeable or unnoticeable in the final product. The back surface of the paper can be inspected to observe the peel line.

The image can be thermally transferred to the fabric using an ordinary household iron or heat press. A preferred method involves the following steps:

a) printing an image on the ink-receptive film coating with an ink-jet printer, b) peeling away at least one removable panel of the support paper from the imaged film coating, c) placing the imaged film coating on a fabric material, d) placing a protective paper (e.g., a transparent silicone-coated paper) over the imaged film coating, e) hand-ironing the protective paper so that the imaged film coating is pressed into the fabric and the image is transferred to the fabric; and f) removing the protective paper from the fabric.

The ink-jet printable media of this invention, comprising a support paper with independently removable panels, can provide several advantages to the consumer. Generally, a person can easily remove each panel by a single hand peeling action along the peel line. A person can grasp each removable panel independently from the imaged film coating. Thus, a person can remove each panel without grasping and damaging the imaged film coating. The entire paper can be removed completely and cleanly in a piece-by-piece manner.

In contrast, it can be difficult to remove an entire sheet of a conventional paper in a single continuous peeling action for several reasons. First, a person needs to overcome a relatively high level of resistance when peeling away the entire sheet of such a paper. Secondly, a person typically must first tear or rip a piece of the paper so that he or she can then peel away the paper. Thirdly, a person typically needs to grasp both surfaces of the medium (support paper and imaged film coating) with his or her hands in order that he or she can peel away the paper. This gripping of the imaged film coating can distort and damage the coating.

In addition, a person may be able to align and position the image on the fabric more effectively using the media of this invention. The removable panels of the support paper can be of any shape and size. For example, the support paper can comprise three (3) removable panels having equal dimensions. The panels can be divided by means of two (2) peel lines. A person can peel-away the middle panel of the paper, properly align that portion of the imaged film coating on the fabric, and then peel-away the remaining panels of the paper. Also, creative designs can be produced using the media. For example, a person may wish to transfer only a portion of an image to a fabric. In such an event, a person can use scissors to easily cut the removable panel along the peel line so that the imaged film coating remains attached to the paper. Then, the person can peel-away that section of the paper, position the imaged film coating on the fabric, place a protective paper over the imaged film coating, and iron the paper so that only that portion of the image transfers to the fabric.

The media of this invention provide other benefits. For example, each panel can be removed without ripping or tearing the medium (support paper and imaged film coating). This feature is an advantage, because tearing the medium can distort the imaged film coating and resultant image.

The media of this invention allow a person to remove one panel and affix the underlying imaged film coating to the fabric. Subsequently, additional panels can be removed, and the images affixed. In this way, a manageably sized imaged region can be affixed each time to the fabric. This is particularly advantageous when a full sized image is larger than the useful space on an ironing board or when the shape of the garment is different such that the entire imaged layer will not lay flat over the garment. For example, the arm regions of shirts or regions with pleats or raised letters, would have such shapes. In addition, some garments have adjacent segments made of different fabrics that are best imaged at different temperatures.

With independently removable panels, it is practical to remove the entire composite (image and related coating layers) from the support paper without significant distortion. Thus, the consumer can pick up the composite and place it on a fabric for affixing. In turn, this feature makes it possible to use correct reading (as opposed to reverse reading) images.

Referring to step (b), a person can remove each panel of the support paper prior to placing the imaged film coating in contact with the fabric. Referring to step (c), the imaged film coating can be placed face-upwards or face downwards on the fabric. For light-colored fabrics, e.g., white T-shirts, the imaged film coating is preferably placed face downwards. For dark-colored fabrics, e.g., black T-shirts, the imaged film coating is preferably placed face upwards.

Preferably, the sheet of protective paper (or overlay sheet) used in step (d) is transparent or translucent. If a transparent sheet is used, the person ironing the sheet can better align the image with the desired position on the fabric. Further, the person ironing the sheet can better observe the image as it transfers to the fabric and he or she can avoid under- or over-heating the fabric. Avoiding under- or over-heating of the fabric is aided by the fact that when sufficient heat has been applied, the contact between the transparent or translucent sheet and the image is good, and the appearance is clarified. If too little heat is applied, the image does not completely transfer and the image may peel off the fabric. If too much heat is applied, burn marks may appear on the image and fabric. More preferably, a stick-resistant transparent paper, e.g., a silicone-coated tissue paper is used. A person can easily remove such papers from the fabric after the ironing step. Alternatively, opaque protective papers can be used.

The protective paper can comprise conventional time/temperature indicators that change in a noticeable manner when heated. For example, the time/temperature indicators may change color when heated to a specific temperature over time. In one embodiment, the paper can be printed with a symbol using thermochromic ink that changes color when heated to a specific temperature. In other embodiments, the time/temperature indicator can be incorporated into a coating that is applied to the protective paper. Alternatively, a time/temperature indicator adhesive strip can be applied to the protective paper. Papers comprising conventional time/temperature indicators may provide valuable benefits. For example, a person may be able to thermally transfer the image to the fabric more effectively and avoid over or under-heating, since the time/temperature indicator can be designed to signal complete transfer of the image to the fabric.

In addition, the protective papers can comprise thermal-activating color additives, fragrance additives, insect-repellent additives, and the like that release from the paper when the paper is heated to a specific temperature. The released ingredients may impart a desirable color, scent, insect-repellency and the like to the image on the fabric.

The above-described removable panels of the support paper can also comprise such time/temperature indicators and thermal-activating color additives, fragrance additives and the like.

Concerning the ink-jet transfer papers of this invention, the front surface of the support paper can have a variety of coating structures. For example, a silicone coating can be applied to the front surface, and the above-described ink-receptive film coating can be applied over the silicone coating. Although a silicone coating is not required, such a coating can help prevent the support paper from sticking to the ink-receptive film coating, thereby allowing the paper to be removed more easily.

In other embodiments, a "hot-melt" layer can be applied to the front surface, and the above-described ink-receptive film coating can be applied over the hot-melt film coating. In such instances, the removable panels of the paper are peeled away from the ink-receptive and hot-melt film coatings per the above-described application method. The hot-melt film coating or layer may serve many functions. For example, the hot-melt layer may act as an adhesive-like layer preventing delamination of the ink-receptive film coating from the support paper. In addition, as described above, an ordinary hand iron is used typically to heat-transfer the image to the fabric. The hot-melt layer and image are heat-transferred to the fabric by means of pressing the hot-melt layer and imaged ink-receptive film coating into the fabric with the hot iron. The hot-melt layer helps the transferred image adhere to the fabric. Preferably, the hot-melt layer comprises a thermoplastic polymer. Suitable thermoplastic polymers include, for example, waxes, polyamides, polyolefins, polyesters, poly(vinyl chloride), poly(vinyl acetate), polyacrylates, polystyrene, polyacrylic acid, poly(ethylene-co-acrylic acid), poly(ethylene-co-methacrylic acid), poly(ethylene-co-vinyl acetate) polymers, and the ionomers, salts, copolymers and mixtures thereof. Preferably, the thermoplastic polymer has a melting point in the range of 60° C. to 180° C.

The coating layers may contain various additives. For example, the ink-receptive coating may contain substantially porous thermoplastic particles having a high surface area such as polyolefin, polyamide, and polyester particles. These particles can absorb the water and water-miscible solvents contained in the aqueous-based inks. Other possible additives include, for example, surface active agents that control the wetting or flow behavior of the coating solutions, anti-static agents, suspending agents, antifoam agents, acidic compounds to control pH, optical brighteners, UV blockers/stabilizers, and the like.

Conventional coating techniques can be used to apply the coatings to the support paper. For example, roller, blade, wire bar, dip, solution-extrusion, air-knife, and gravure coating techniques can be used. Typically, the total weight of the coating layers is in the range of about 30 to about 70 grams per square meter (gsm). The coat weight of the ink-receptive film coating is typically about 10 to about 30 gsm, and the coat weight of the hot-melt film coating is typically about 20 to about 40 gsm. Conventional drying ovens can be used to dry the coatings.

The ink-jet transfer papers of this invention can be printed with an image using any conventional ink-jet printer. For example, ink-jet printers made by Océ N.V., Hewlett-Packard, Epson, Encad, Canon, and others can be used.

The printed image can be transferred to any fabric material, for example, sweatshirts, T-shirts, cotton bags, computer mouse pads, and the like.

For light-colored fabrics, e.g., white T-shirts, the ink-jet transfer paper may have the following coating structure. First, the support paper is coated with a wax-like, hot-melt layer comprising an ethylene/acrylic acid copolymer. Secondly, an ink-receptive layer comprising a polyamide film-forming binder and highly porous polyamide pigment is coated over the hot-melt coating. This coating structure is further described in Published PCT International Application WO 98/30749, the disclosure of which is hereby incorporated by reference.

For dark-colored fabrics, e.g., black T-shirts, a white background layer should be created on the fabric so that the transferred image is more visible. Ink-jet transfer papers for such dark-colored fabrics may have the following coating structure. First, the support paper is coated with a wax-like, hot-melt layer comprising an ethylene/acrylic acid copolymer or polyurethane dispersion and polyester particles. Secondly, a white background layer comprising an elastic-like polymer such as a polyurethane, polyacrylate, polyalkylene, or natural rubber and a white pigment (e.g., $BaSO_4$, ZnS, $TiO_2$, or SbO) is coated over the hot-melt layer. Thirdly, ad ink-receptive layer comprising a polyamide film-forming binder and highly porous polyamide pigment is coated over the hot-melt coating. This coating structure is further described in Published PCT International Application WO 00/73570 A1, the disclosure of which is hereby incorporated by reference.

U.S. patent application Ser. No. 09/838,654, "Ink-Jet Printable Transfer Papers For Use With Fabric Materials", having a filing date of Apr. 19, 2001, the disclosure of which is hereby incorporated by reference, discloses another coating structure. The support paper is coated with layer (a) and ink-receptive layer (b). Layer (a) comprises a polyurethane binder and inorganic pigment, and layer (b) comprises a polyurethane binder and organic polymeric particles. Suitable inorganic pigments include silica, alumina, titanium dioxide, zinc sulfide, zinc oxide, antimony oxide, barium sulfate, and calcium carbonate. Suitable organic polymeric particles include polyamides, polyolefins, and polyesters. The support paper may first be coated with a silicone layer and a hot-melt layer.

The present invention is further illustrated by the following examples using the below-described test methods, but these examples should not be construed as limiting the scope of the invention.

EXAMPLES

Example 1

The following coating formulations were prepared:

1) a hot-melt layer comprising ENOREX VN 379 ((an aqueous dispersion containing polymerized acrylic acid, ethylene, methyl methacrylate, 2-ethylhexyl acrylate, and ammonia, available from Collano Ebnöther AG, Switzerland);
2) a white background layer comprising SANCURE 12929 (a polyurethane dispersion, available from B.F. Goodrich Co.), TINT AYD NV7003 (titanium dioxide pigment, available from Daniel Products, New Jersey), and BYK 348 (a surfactant, available from BYK-Chemie); and
3) an ink-receptive layer comprising WITCO W-213, ORGASOL (polyamide resin particles, available from Elf Atochem North America, Inc. ), water, and ethanol.

Example 2

The following coating formulations were prepared:

1) a hot-melt layer comprising ENOREX VN 379 (an aqueous dispersion containing polymerized acrylic acid, ethylene, methyl methacrylate, 2-ethylhexyl acrylate, and ammonia, available from Collano Ebnöther AG, Switzerland); and
2) an ink-receptive layer comprising ELVAMIDE 8023 (a polyamide multipolymer resin, available from E.I. du Pont de Nemours and Company, Inc.), ORGASOL (polyamide resin particles, available from Elf Atochem North America, Inc.), water, and ethanol.

In each of the above examples, the hot melt formulation was applied first to a silicone-coated support paper using a Meyer metering rod and dried in an oven at 110° C. for about 3 minutes. Referring to Example 1, the white background coating formulation was then applied over the hot-melt layer using a Meyer metering rod and dried in an oven at 110° C. for about 3 minutes. Lastly, the ink-receptive coating formulation was applied over the white background layer (Example 1) or hot-melt layer (Example 2) using a Meyer metering rod and dried in an oven at 110° C. for about 3 minutes.

The support paper measured 8.5×11 inches. After application and drying of the coatings, the back surface (non-coated side) of the support paper was scored with a scoring knife to form a peel line extending from one edge of the paper to the opposite edge. Thus, the paper comprised two independently removable panels.

A Hewlett Packard 970 ink-jet printer was used to print an image on the ink-receptive film coatings in each of the examples. After the image was printed, one panel of the paper was peeled away from the imaged film coating along the peel line. Then, the other panel of the paper was peeled away from the imaged film coating. The paper panels were peeled-off easily and completely by hand.

Referring to Example 1, the imaged film coating was placed on a black cotton T-shirt so that the image faced upwards. A silicone-coated transparent paper was placed over the imaged film coating. The transparent paper was ironed using an ordinary household hand iron. The iron was set at "maximum cotton" and heated. The hot iron was applied to the transparent paper using moderate pressure for about two (2) to three (3) minutes, and the image was heat-transferred to the T-shirt. After cooling for about three (3) to five (5) minutes, the transparent paper was peeled away from the T-shirt.

Referring to Example 2, the imaged film coating was placed on a white cotton T-shirt so that the image faced downwards. A silicone-coated transparent paper was placed over the imaged film coating. The transparent paper was ironed using an ordinary household hand iron. The iron was set at "maximum cotton" and heated. The hot iron was applied to the transparent paper using moderate pressure for about two (2) to three (3) minutes, and the image was heat-transferred to the T-shirt. After cooling for about three (3) to five (5) minutes, the transparent paper was peeled away from the T-shirt.

What is claimed is:

1. A method for applying an image to a fabric material, comprising the following steps:

a) providing an ink-jet printable transfer medium, comprising a support paper having a surface coated with an ink-receptive film coating, said support paper comprising at least two independently removable panels divided by means of a peel line, wherein each panel is capable of being peeled away from the film coating.

b) printing an image on the ink-receptive film coating with an ink-jet printer, c) peeling away at least one removable panel of the support paper from the imaged film coating, d) placing the imaged film coating on a fabric material, e) placing a protective paper over the imaged film coating, f) hand-ironing the protective paper so that the imaged film coating is pressed into the fabric and the image is transferred to the fabric; and g) removing the protective paper from the fabric.

2. The method of claim 1, wherein each panel of the support paper is removed in step (c).

3. The method of claim 1, wherein the imaged film coating is placed on the fabric such that the image faces upwards.

4. The method of claim 1, wherein the imaged film coating is placed on the fabric such that the image faces downwards.

5. The method of claim 1, wherein the fabric has a color that is distinguishable from white.

6. The method of claim 1, wherein the fabric is white.

7. The method of claim 1, wherein the protective paper is a transparent paper.

8. The method of claim 1, wherein the transparent paper comprises a silicone coating.

9. The method of claim 1, wherein the protective paper comprises a time/temperature indicator that changes color when heated to a specific temperature over time.

10. The method of claim 1, wherein the protective paper comprises an additive selected from the group consisting of thermal-activating color additives, fragrance additives, and insect-repellent additives, and mixtures thereof.

* * * * *